United States Patent

[11] 3,529,501

[72] Inventors Herman J. Baldwin
Cincinnati, Ohio;
George W. Sederberg, Highland Heights, Kentucky
[21] Appl. No. 789,879
[22] Filed Jan. 8, 1969
[45] Patented Sept. 22, 1970
[73] Assignee Cincinnati Milacron Inc.
Cincinnati, Ohio
a corporation of Ohio

[54] ROCKABLE CLOSURE DEVICE FOR MATERIAL CUTTING MACHINE
7 Claims, 3 Drawing Figs.

[52] U.S. Cl. .................................................. 83/111,
83/428, 83/425, 83/925
[51] Int. Cl. ...................................................... B26d 7/02
[50] Field of Search ........................................... 83/111,
145, 146, 428, 455, 925CC

[56] References Cited
UNITED STATES PATENTS
3,304,820  2/1967  Muller et al. ................. 83/428X

*Primary Examiner*—James M. Meister
*Attorney*—Frank C. Leach, Jr.

ABSTRACT: Closure means is disposed between a pair of rockably supported hold down housings, which exert a predetermined force on material being cut by a cutting blade of a material cutting machine. The closure means includes first and second members spaced from each other with the members being supported by the rockably supported housings to allow the members to move with the rockably supported housing when the material has a hump therein. The closure means has a third member slidably supported between the first two members and movable transversely with the cutting blade of the material cutting machine.

ROCKABLE CLOSURE DEVICE FOR MATERIAL CUTTING MACHINE

SPECIFICATION

In the copending U.S. Pat. application of Herman J. Baldwin and Phillip F. Stapf, Jr., for "Hold Down Apparatus For Material Cutting Machine," Ser. No. 757,011, filed September 3, 1968, and assigned to the same assignee as the assignee of the present application, a pair of rockably supported housings is disposed on opposite sides of the cutting blade. The rockably supported housings are supported for simultaneous raising and lowering relative to the material being cut. Each of the housings has an endless band or belt that engages the material. The total force exerted on the material by the rockably supported housings is controlled.

The rockably supported housings are rockable whenever a hump in the material, which is being cut, passes therebeneath. Thus, the rockably supported housings continue to exert the desired downward force on the material even though there are humps in the material being cut.

It is necessary to space the rockably supported housings a distance from each other because the rockably supported housings must not have their endless bands or belts exerting a downward force on the material in an area in which the material is not supported by its lower support structures. The lower support structures for the material must be spaced a distance from each other to accommodate the lower support structure for the cutting blade, which moves transversely between the lower support structures for the material. Additionally, since the rockably supported housings must be raised upwardly from engagement with the material to allow removal of the material from the lower support structures and the loading of other material on the lower support structures upon the completion of cutting of the material, the rockably supported housings must be spaced a distance to accommodate the upper support structure for the cutting blade including the support structure for the cutting blade guide.

As a result, there is an area in which the material being cut would tend to fluff or rise upwardly due to the downward force exerted on each side of this area by the rockably supported housings. It is necessary to limit this fluffing so that true patterns are cut in the material.

Furthermore, when the material is cut, it has a tendency to want to curl upwardly along its cut line. As a result, some of the material would not be disposed in the desired plane to form true cutting patterns therein thereafter. This also might result in some layers of the material being bent backwardly whereby jamming of the material cutting machine could occur.

The present invention satisfactorily solves the foregoing problems by utilizing a closure device to substantially reduce the area above the material being cut between the rockably supported housings without interfering with the upper support structure for the cutting blade and its guide when the rockably supported housings are lifted upwardly. Thus, the closure device may be readily lifted with the rockably supported housings when material is to be loaded on or removed from a material cutting machine. Furthermore, the closure device is mounted so that it moves with the rockably supported housings whenever they are moved due to humps in the material.

It is still necessary to leave a slight space between the members of the closure device to allow the cutting blade to move transversely. However, this is a much smaller distance than the distance between the rockably supported housings.

Furthermore, the closure device of the present invention includes a member that extends between the two members, which are spaced from each other to accommodate the transverse movement of the cutting blade, and is adapted to close the area above the material in the area in which the cutting blade is in cutting engagement with the material. This member is movable with the cutting blade so as to not block movement by the cutting blade in the transverse direction.

As a result of utilizing this additional member that is movable with the cutting blade, the present invention limits the lifting of the material by the reciprocating cutting blade. Thus, any tendency of the cutting blade to lift the material adjacent the cutting blade is limited to such an extent that it will not affect the cutting of true patterns.

An object of this invention is to provide a closure device that substantially reduces the exposed area of the top of the material being cut in the area in which cutting occurs.

Another object of this invention is to provide a device to limit lifting of the material, which is being cut by reciprocating motion of a cutting blade, by the cutting blade during cutting.

Other objects of this invention will be readily perceived from the following description, claims, and drawings.

This invention relates to a material cutting machine comprising means to support material to be cut by cutting means. The machine has first rockably supported means disposed adjacent one side of the cutting means with the first rockably supported means being disposed above the material and exerting a downward force on the material supported by the material supporting means. Second rockably supported means is disposed adjacent the other side of the cutting means with the second rockably supported means being disposed above the material and exerting a downward force on the material supported by the material supporting means. The first and second rockably supported means have closure means disposed therebetween to substantially close the area therebetween above the material supported on the material supporting means. Closure means, which includes means to receive the cutting means, has means to secure the closure means to each of the first and second rockably supported means.

The attached drawings illustrate a preferred embodiment of the invention, in which.

Figure 1:
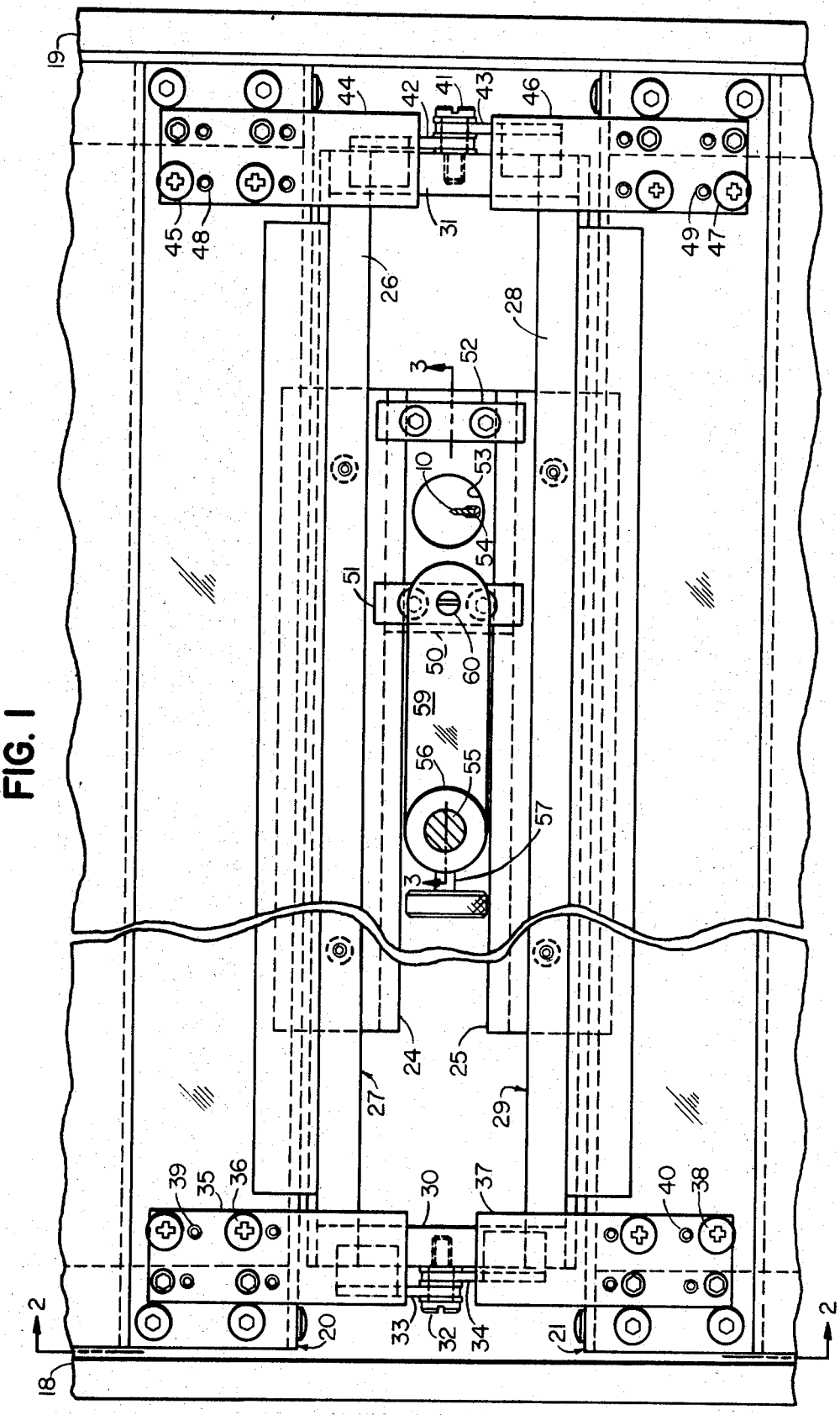
FIG. 1 is a top plan view of a portion of a material cutting machine utilizing the closure device of the present invention.

Referring to the drawings, there is shown a material cutting machine of the type more particularly shown and described in the copending U.S. Pat. application of George W. Sederberg for "Material Cutting Machine Having Reciprocating Cutting Blade Adapted to Enter Material Without an Entrance Cut," Ser. No. 726,657, filed May 6, 1968, and assigned to the same assignee as the assignee of the present application. The material cutting machine has a reciprocating cutting blade 10, which is reciprocated by an electric motor as more particularly shown and described in the aforesaid Sederberg application.

The motor is disposed within a housing 11 (see FIG. 3), which supports the cutting blade 10. As more particularly shown and described in the aforesaid Sederberg application, the housing 11 is movable in a transverse direction to move the cutting blade 10 transversely relative to material 12 (see FIG. 2), which may be a plurality of layers of cloth, for example.

As more particularly shown and described in the aforesaid Sederberg application, the material 12 is supported on endless bands 14 and 15 and throat way sections 16 and 17. The gap, which is formed between the throat way sections, may be closed as more particularly shown and described in the aforesaid Sederberg application. The bands 14 and 15 are driven in unison to move the material 12 longitudinally relative to the cutting blade 10 as more particularly shown and described in the aforesaid Sederberg application.

The material cutting machine includes a pair of L-shaped supports 18 and 19 (see FIG. 1), which are disposed on opposite sides of the endless bands 14 and 15. The L-shaped supports 18 and 19 are mounted for vertical movement in the manner more particularly shown and described in the aforesaid Baldwin et al. application.

A hold down housing 20 is rockably supported at one end on the L-shaped support 18 and at its other end on the L-shaped support 19. A hold down housing 21, which is disposed on the opposite side of the cutting blade 10 from the housing 20, has one end rockably supported on the L-shaped support 18 and its other end rockably supported on the L-shaped support 19.

The housing 20 has a flexible endless band or belt 22 supported therein in the manner more particularly shown and described in the aforesaid Baldwin et al. application. The housing 21 has an endless band or belt 23 supported therein in the manner more particularly shown and described in the Baldwin et al. application.

The endless bands 22 and 23 are positioned in engagement with the top of the material 12 and exert a predetermined force thereon in the manner more particularly shown and described in the aforesaid Baldwin et al. application. The force, which the bands 22 and 23 exert on the material 12, is controlled in the manner more particularly shown and described in the aforesaid Baldwin et al. application.

The closure device of the present invention includes a pair of parallel members 24 and 25, which extend the length of the distance through which the cutting blade 10 can be moved transversely and are spaced from each other to provide an area through which the cutting blade 10 may move transversely relative to the material 12. The members 24 and 25 reduce the area between the rockably supported housings 20 and 21 above the material 12.

The member 24 is fixed to a lower flange 26 of a member 27 while the member 25 is fixed to a lower flange 28 of a member 29. The members 27 and 29 cooperate with each other to form a unitary frame due to a block 30 securing one end of the members 27 and 29 to each other and a block 31 securing the other end of the plates 27 and 29 to each other. The frame, which is formed by the members 27 and 29 and the blocks 30 and 31, is connected to each of the housings 20 and 21.

The block 30 has a screw 32 connected thereto with arms 33 and 34 pivotally connected to the screw 32. There is a slight clearance between each of the arms 33 and 34 and the screw 32 so that a tight joint is not provided therebetween.

The arm 33 has a plate 35 fixed thereto. The plate 35 is secured to the housing 20 by screws 36. The arm 34 has a plate 37 fixed thereto. The plate 37 is attached to the housing 21 by screws 38.

The position of the plate 35 with respect to the housing 20 is adjustable through the use of jacking screws 39. Similarly, jacking screws 40 are utilized to adjustably position the plate 37 with respect to the housing 21.

A similar arrangement exists at the other end of the frame wherein the block 31 has a screw 41 connected thereto with arms 42 and 43 pivotally connected to the screw 41. There is a slight clearance between each of the arms 42 and 43 and the screw 41 so that a tight joint is not provided therebetween.

The arm 42 has a plate 44 fixed thereto and attached to the housing 20 by screws 45. The arm 43 has a plate 46 fixed thereto and connected to the housing 21 by screws 47.

Jacking screws 48 are employed to adjust the position of the plate 44 with respect to the housing 20. Similarly, jacking screws 49 are used to adjust the position of the plate 46 with respect to the housing 21.

Accordingly, the frame, which supports the members 24 and 25, is adjustable with respect to the top of the material 12 through utilization of the jacking screws 39, 40, 48, and 49. Thus, the frame is adjustable in relation to the top of the material 12 being cut depending on the type of material being cut.

The members 24 and 25 have their sides, which are closest to each other, inclined to form a cooperating dovetail arrangement with a member 50, which is slidably disposed therebetween. The member 50 is mounted for movement with the cutting blade 10.

Figure 2:
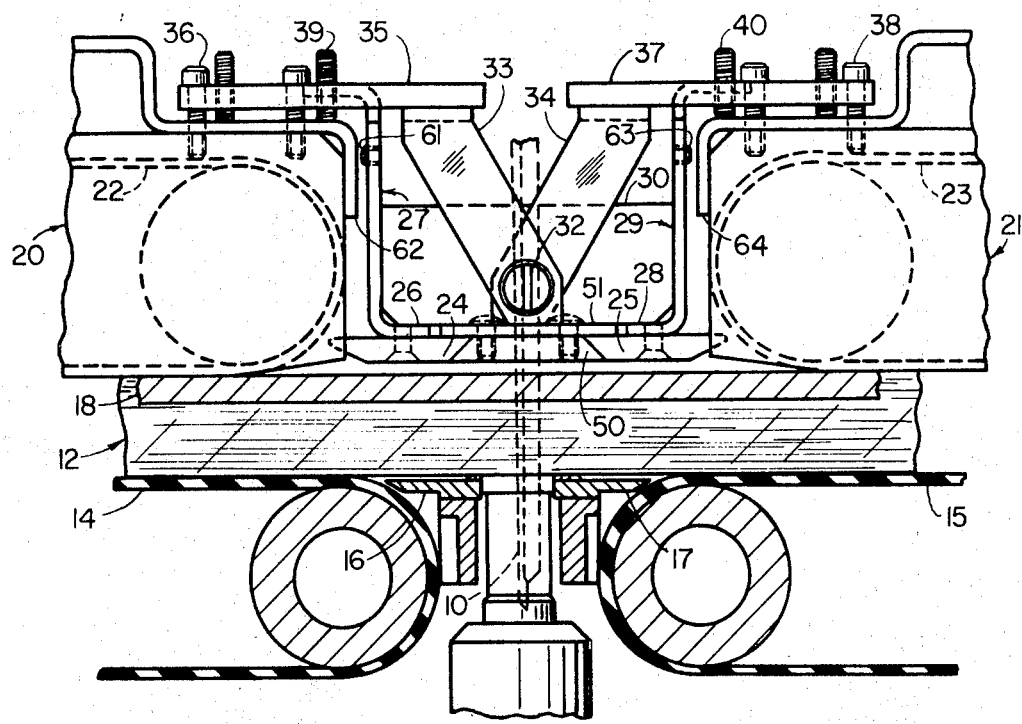
FIG. 2 is an end elevational view, partly in section, showing the mounting arrangement of the closure device and taken along line 2—2 of FIG. 1.
Figure 3:
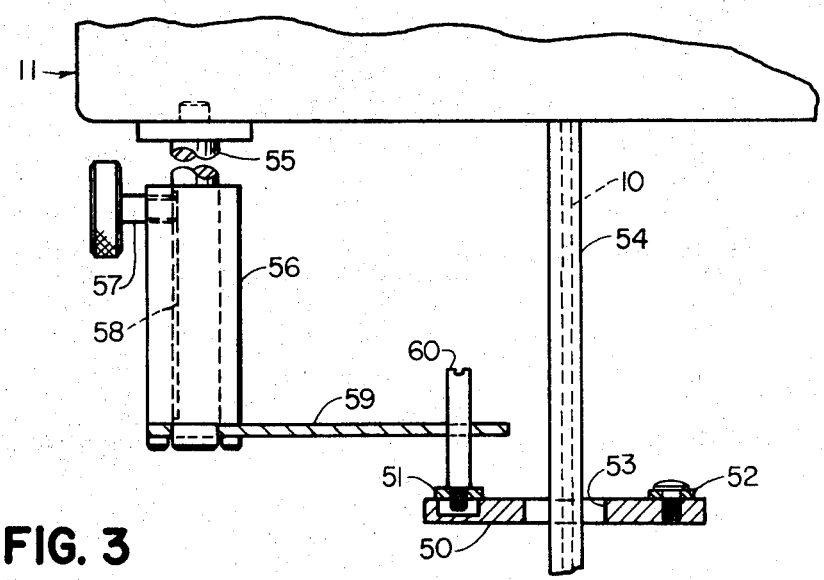
FIG. 3 is a sectional view, partly in elevation, showing the arrangement for moving a sliding member of the closure device with the cutting blade during its transverse movements and taken along line 3—3 of FIG. 1.

The member 50 is supported on the members 24 and 25 by means of bars 51 and 52, which are fixed to the upper surface of the member 50. As shown in FIGS. 1 and 2, each of the bars 51 and 52 overlies a portion of the upper surfaces of the members 24 and 25.

The member 50 has an opening 53 formed therein to receive the cutting blade 10 and its guide 54. Thus, the member 50 will engage the material 12 adjacent the cutting blade 10 if the material 12 is lifted by the cutting blade 10. The member 50 limits any lifting of the material 12 adjacent the cutting blade 10 as this area is completely closed except for the opening 53.

The members 24, 25, and 50 are preferably formed of a lightweight material such as Plexiglas, for example. Any other suitable material may be employed although it is preferred that the material be both transparent and lightweight.

The member 50 is maintained in alignment with the cutting blade 10 by being attached to the housing 11, which supports the cutting blade 10 and moves it transversely, for movement therewith. The connection between the member 50 and the housing 11 includes a rod 55, which extends downwardly from the housing 11 and is fixed thereto. A hollow cylindrical member 56 is slidably mounted on the rod 55 and retained in a desired vertical position thereon by a set screw 57, which is threadedly mounted in the hollow cylindrical member 56, engaging against a flat surface 58 of the rod 55.

The hollow cylindrical member 56 is fixed by screws, for example, to a plate 59. A rod 60, which extends through an opening in the plate 59, is fixed to the bar 51 whereby transverse movement of the plate 59 with the cutting blade 10 is transmitted to the member 50 to cause it to slide between the members 24 and 25.

The vertical position of the plate 59 with respect to the member 50 is adjustable through positioning the hollow cylindrical member 56 on the rod 55 by means of the set screw 57. This adjustment is necessary to dispose the plate 59 in accordance with the vertical position of the member 50; the vertical position of the member 50 is selected to accommodate any humps in the material 12. Furthermore, due to the vertical sliding arrangement between the plate 59 and the rod 60, the member 50 may be lifted upwardly towards the plate 59 when the L-shaped supports 18 and 19 are raised.

The member 27 has a pair of set screws 61, which are longitudinally spaced from each other, mounted in its vertical portion to limit the pivotal movement of the member 27 relative to the housing 20 by the set screws 61 engaging a flange 62 of the housing 20. Likewise, the member 29 has a pair of set screws 63, which are longitudinally spaced from each other, mounted in its vertical portion to limit the pivotal movement of the member 29 relative to the housing 21 by the set screws 63 engaging a flange 64 of the housing 21. By limiting the movement of the members 27 and 29, there is no possibility of one of the members 24 and 25 being moved so that the member 50 would not be supported.

Considering the operation of the material cutting machine with the closure device of the present invention, the material 12 is advanced longitudinally through driving the endless bands 14 and 15 in unison in the manner more particularly shown and described in the aforesaid Sederberg application. Likewise, the cutting blade 10, which is rotatable, is moved transversely relative to the material 12 in the manner more particularly shown and described in the aforesaid Sederberg application.

Whenever the cutting blade 10 is moved transversely away from its position of FIG. 1 wherein it is in its rightmost position, the member 50 moves with the cutting blade 10 by sliding between the members 24 and 25. As a result, the area adjacent the material 12 with which the cutting blade 10 is in engagement is completely closed. Thus, there can be no curling of the material 12 adjacent the cutting blade 10 when the material 12 is cut.

If a hump should occur in the material as it advances from left to right, for example, in FIG. 2, the rockably supported housing 20 would rock and cause the frame for the members 24 and 25 to rock about the axes of the screws 32 and 41. Thus, the closure device of the present invention follows the raising and lowering of the material 12 due to a hump, for example.

While the members 24, 25, and 50 have been shown in spaced relation to the top of the material 12, it should be understood that the members 24, 25, and 50 could be mounted in engagement with the top of the material 12. Of course, this would require the material 12 to have sufficient flexibility to allow the desired movement of the members 24, 25, and 50 about the axes of the screws 32 and 41 when there is a hump in the material 12. Accordingly, in some instances, the members 24, 25, and 50 may be placed in engagement with the top of the material 12.

While the closure device of the present invention has been shown and described as having a third member slidably supported between the members 24 and 25 and disposed in the same plane as the members 24 and 25, it should be understood that the third member could be replaced by other types of closure means that are not supported by the members 24 and 25. For example, the hold down plate of the copending U.S. Pat. application of Herman J. Baldwin for "Hold Down Plate For Use With Material Cutting Machine", Ser. No. 726,782, filed May 6, 1968, and assigned to the same assignee as the assignee of the present application could be employed. It is only desired that the closure device include some type of means to close the area adjacent the cutting blade 10.

While the closure device of the present invention has been described with respect to a reciprocating cutting blade of the type shown and described in the aforesaid Sederberg application, it should be understood that the closure device of the present invention may be readily utilized with any material cutting machine having a cutting blade.

An advantage of this invention is that it reduces the tendency of the material to curl up along an edge that has been cut when the edge is disposed in an area between the rockably supported hold down housings. Another advantage of this invention is that the closure device accommodates humps in the material.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

We claim:

1. A material cutting machine comprising:
 cutting means;
 means to support material to be cut by said cutting means;
 first rockably supported means adjacent one side of said cutting means, said first rockably supported means being disposed above the material and exerting a downward force on the material supported by said material supporting means;
 second rockably supported means adjacent the other side of said cutting means, said second rockably supported means being disposed above the material and exerting a downward force on the material supported by said material supporting means;
 closure means disposed between said first rockably supported means and said second rockably supported means to substantially close the area therebetween above the material supported on said material supporting means;
 said closure means including means to receive said cutting means; and
 said closure means having means to secure said closure means to each of said first rockably supported means and said second rockably supported means.

2. The material cutting machine according to claim 1 including means to vertically adjust the position of said closure means relative to each of said first rockably supported means and said second rockably supported means.

3. The material cutting machine according to claim 1 including:
 means to produce relative movement in a longitudinal direction between said material supporting means and said cutting means to move one of the material on said material supporting means and said cutting means relative to the other in a longitudinal direction;
 means to produce relative movement in a transverse direction between said cutting means and said material supporting means in coordination with said longitudinal relative moving means to move one of the material on said material supporting means and said cutting means relative to the other in a transverse direction;
 and said closure means includes:
 a pair of members disposed on opposite sides of said cutting means;
 means to connect said members to said first rockably supported means and said second rockably support means;
 means disposed between said pair of members to receive said cutting means; and
 said disposed means being movable between said pair of members when there is relative transverse movement between said cutting means and said material supporting means.

4. The material cutting machine according to claim 3 in which:
 said transverse relative moving means moves said cutting means transversely while said material supporting means is stationary in the transverse direction; and
 means connects said disposed means of said closure means to said transverse relative moving means for movement with said cutting means.

5. The material cutting machine according to claim 3 in which said disposed means of said closure means is a third member slidably supported between said pair of members and slidable therebetween.

6. The material cutting machine according to claim 3 including:
 a frame to support said closure means;
 first means to pivotally connect one end of said frame to said first and second rockably supported means; and
 second means to pivotally connect the opposite end of said frame to each of said first and second rockably supported means.

7. The material cutting machine according to claim 5 including:
 first means to connect one end of each of said pair of members to each other;
 second means to connect the other end of each of said pair of members to each other;
 first means to pivotally connect said first connecting means to said first rockably supported means;
 second means to pivotally connect said first connecting means to said second rockably supported means;
 third means to pivotally connect said second connecting means to said first rockably supported means; and
 fourth means to pivotally connect said second connecting means to said second rockably supported means.